(12) United States Patent
Douarre (10) Patent No.: US 8,371,512 B2
(45) Date of Patent: Feb. 12, 2013

(54) ELECTRICAL OR HYBRID MOTOR VEHICLE WITH THERMAL CONDITIONING SYSTEM UPGRADING LOW-LEVEL SOURCES

(75) Inventor: Alain Douarre, Gif sur Yvette (FR)

(73) Assignee: Dow Kokam France SAS, Massy (FR)

( * ) Notice: Subject to any disclaimer, the term of this patent is extended or adjusted under 35 U.S.C. 154(b) by 1222 days.

(21) Appl. No.: 12/278,451

(22) PCT Filed: Feb. 7, 2007

(86) PCT No.: PCT/FR2007/000226
§ 371 (c)(1),
(2), (4) Date: Aug. 6, 2008

(87) PCT Pub. No.: WO2007/090965
PCT Pub. Date: Aug. 16, 2007

(65) Prior Publication Data
US 2009/0020620 A1   Jan. 22, 2009

(30) Foreign Application Priority Data

Feb. 9, 2006 (FR) .................................. 06 01184

(51) Int. Cl.
*B60H 1/03* (2006.01)
*B60H 1/04* (2006.01)
*B60H 1/00* (2006.01)
*B60H 1/22* (2006.01)
*B60N 2/56* (2006.01)
*F25B 1/00* (2006.01)
*F25B 21/00* (2006.01)

(52) U.S. Cl. ........ 237/2 B; 237/8 A; 237/2 A; 237/12.1; 237/12.3 R; 237/12.3 B; 237/13; 237/28; 237/34; 237/44; 62/3.1; 62/498

(58) Field of Classification Search .................. 237/2 B, 237/2 A, 8 A, 8 D, 12.1, 12.3 B, 12.3 R, 13, 237/28, 34, 44; 62/3.1, 498; B60H 1/03, 1/00, 1/02, 1/04, 1/06, 1/08, 1/10, 1/22; B60N 2/56; F25B 1/00, 21/00
See application file for complete search history.

(56) References Cited

U.S. PATENT DOCUMENTS 5,289,698 A * 3/1994 Garimella ..................... 62/498
5,293,928 A * 3/1994 Iida et al. ..................... 165/204
(Continued)

FOREIGN PATENT DOCUMENTS

DE    4132939 A1   4/1993
DE   19629114 A1   1/1998
(Continued)

OTHER PUBLICATIONS

ISR issued in the priority application PCT/FR2007/000226.
(Continued)

*Primary Examiner* — Steven B McAllister
*Assistant Examiner* — Daniel E Namay
(74) *Attorney, Agent, or Firm* — Harness, Dickey & Pierce, P.L.C.

(57) ABSTRACT

A motor vehicle has a low exhaust heat engine (ME) for driving the driven wheels and a system for conditioning the air temperature of the passenger compartment (CAB). The conditioning system includes a reversible heat pump (PAC) which conditions in temperature respectively a distribution loop (DI) and an exhaust loop (RE) through which flows a coolant. The distribution loop (DI) is connected to an exchanger (H2) with the air entering the space compartment (CAB) and is connectable via an electromagnetic valve (EV1) to another exchanger (H1) with the air entering the passenger compartment (CAB). The exhaust loop (RE) is connected to an exchanger (F1) with the outside air. The exhaust loop being further connected to the engine (ME) for exchanging heat with the engine.

20 Claims, 6 Drawing Sheets

U.S. PATENT DOCUMENTS

| | | | |
|---|---|---|---|
| 5,497,941 A * | 3/1996 | Numazawa et al. | 237/2 A |
| 5,678,761 A * | 10/1997 | Ikeda | 237/2 B |
| 5,769,316 A * | 6/1998 | Ikeda et al. | 237/2 B |
| 5,897,056 A * | 4/1999 | Morikawa et al. | 237/12.3 R |
| 5,931,380 A * | 8/1999 | Aoki et al. | 237/12.3 B |
| 6,042,016 A * | 3/2000 | Ikeda | 237/12.3 C |
| 6,662,864 B2 | 12/2003 | Burk et al. | |
| 6,715,540 B2 * | 4/2004 | Kobayashi et al. | 165/202 |
| 6,725,679 B2 * | 4/2004 | Itoh et al. | 62/160 |
| 6,810,952 B2 * | 11/2004 | Ben Fredj et al. | 165/202 |
| 6,823,683 B2 | 11/2004 | Amaral et al. | |
| 7,055,590 B2 * | 6/2006 | Hara | 165/202 |
| 7,140,427 B2 * | 11/2006 | Honda et al. | 165/202 |
| 7,520,320 B2 * | 4/2009 | Itoh et al. | 165/202 |
| 7,650,756 B2 * | 1/2010 | Muller et al. | 62/3.1 |
| 2001/0027663 A1 * | 10/2001 | Zeigler et al. | 62/406 |
| 2001/0035286 A1 * | 11/2001 | Kobayashi et al. | 165/202 |
| 2002/0014330 A1 | 2/2002 | Guyonvarch | |
| 2002/0185546 A1 * | 12/2002 | Homan et al. | 237/2 A |
| 2004/0089014 A1 | 5/2004 | Amaral et al. | |
| 2004/0200610 A1 * | 10/2004 | Hara | 165/202 |
| 2005/0241818 A1 | 11/2005 | Yakumaru et al. | |
| 2006/0053814 A1 * | 3/2006 | Naik et al. | 62/241 |
| 2009/0025398 A1 | 1/2009 | Muller et al. | |

FOREIGN PATENT DOCUMENTS

| | | |
|---|---|---|
| EP | 1164035 A2 | 12/2001 |
| EP | 1176036 A1 | 1/2002 |
| EP | 1329344 A1 | 7/2003 |
| FR | 2621867 A1 * | 4/1989 |
| FR | 2808740 A1 | 11/2001 |
| FR | 2876323 A1 | 4/2006 |
| JP | 60-179322 | 9/1985 |
| JP | 06-048154 | 2/1994 |
| JP | 06-206439 | 7/1994 |
| JP | 07-009844 | 1/1995 |
| JP | 10-315750 | 12/1998 |
| JP | 2001-206039 | 7/2001 |
| JP | 2001253227 A * | 9/2001 |

OTHER PUBLICATIONS

English Language Abstract for DE 19629114, pulled from esp@cenet.
English Language Abstract for DE 4132939, pulled from esp@cenet.
English Language Abstract for EP 1329344, pulled from esp@cenet.
English Language Abstract for FR 2876323, pulled from esp@cenet.
Preliminary Search Report from corresponding French Patent Application No. 0601184 dated Oct. 17, 2006.
Translation of Office Action dated Aug. 9, 2011 from corresponding Japanese Patent Application 2008-553796.

* cited by examiner

ELECTRICAL OR HYBRID MOTOR VEHICLE WITH THERMAL CONDITIONING SYSTEM UPGRADING LOW-LEVEL SOURCES

BACKGROUND

The invention relates to a motor vehicle comprising a low exhaust heat engine for driving the driven wheels, in particular an electric engine possibly combined with a heat engine. In the latter case, the vehicle is commonly qualified as a hybrid vehicle.

As with heat engine motor vehicles, electric or hybrid motor vehicles must integrate a system for conditioning the air temperature of the passenger compartment. These systems for conditioning make it possible to ensure the comfort of passengers as well as additional functions such as the demisting and the defrosting of glass surfaces.

Systems for conditioning the passenger compartment of heat engine vehicles consume a quantity of energy that is incompatible with that available in electric or even hybrid vehicles, in the sense wherein for the latter, the heat engine may be stopped over long durations.

Indeed, in conventional heat engine vehicles, the abundant engine heat losses are at a sufficiently-high temperature to be directly used for heating the passenger compartment, through an inexpensive and very compact system. The relatively massive amount of energy needed for heating (up to 10 KW) are as such satisfied free.

For air conditioning, there are also powerful and compact systems, of which the core is a compressor mechanically driven by the engine, that does not have any disadvantage in use other than a substantial overconsumption of fuel (+3 to 4% on an annual average in temperate regions), but is moreover accepted in light of the advantages in terms of comfort and safety that are procured, as these vehicles do not have any limited autonomy.

Nevertheless, when viewed from a sustainable development standpoint, automobile air conditioning is however criticised, due to this overconsumption and the contribution of the coolant gases implemented to global warming.

Indeed, this extended cooling loop that is distributed in the engine compartment, contains a large quantity of coolant gas, a major contributor to the greenhouse effect and which is difficult to confine during the life of the vehicle.

Controlling the diffusion of this gas into the atmosphere is illusory in that any mechanical intervention concerning the power train requires the cooling loop to be purged, and that the condenser—exchanger wherein this gas circulates, on the front side of the vehicle, is one of the first units to be damaged in the event of a frontal impact.

In contrast with heat engine vehicles, electric or hybrid vehicles have an autonomy in pure electric traction, with heat exhaust that quantitatively is highly insufficient in relation to heating needs, which in addition is at a temperature that is too low to be useable directly.

In air conditioning, on these same vehicles, the drive energy for the compressor has a strong impact on the autonomy in town (in pure electric mode with the hybrid case).

For these new engines, that aim to be environmentally-friendly, non-polluting in town and as independent as possible from non-renewable sources of energy, it is coherent to find solutions that do not discharge anything into the atmosphere, that consume a minimum amount of on-board energy, and that comply with imperatives concerning cost, confined installation and mass, which characterize the automobile.

Adding that it cannot be considered to restrict in any way the level of comfort that modern motorists are used to, or to impose new restrictions that mobilize their time or limit the availability of the vehicle, it appears that no suitable overall solution exists to date, or is even proposed, to satisfy the thermal conditioning needs of the passenger compartment of electric or hybrid vehicles having an autonomy in pure electric traction.

Publications, experimental and even commercial realizations, coming from institutional laboratories, manufacturers or motor vehicle equipment manufacturers have abounded for a few years now, showing the intensity of the search for solutions adapted to these new engines, and more generally to reduction in the impact on the environment of automobile air conditioning.

The solutions that are currently implemented on hybrid vehicles that cannot be recharged via the mains, of which the operating durations with the heat engine stopped remain modest, aim to improve and add to the traditional arrangements of heat engine vehicles, in order to maintain the comfort during the periods when the heat engine is stopped.

For heating, the high thermic inertia of the internal combustion engine allows the comfort to be maintained for a certain period of time. This duration can be usefully prolonged thanks to an extra electric, typically on the air entering into the passenger compartment. When the engine cools down, or when the battery is too discharged, the heat engine is automatically restarted.

With air conditioning, the thermic inertia that can be returned is low and must be quickly relayed. The currently retained solution is a double compressor, delivering its full power with mechanical drive, and power for maintaining, which is more modest, with electric drive. It is naturally more costly and takes up more space than a simple mechanical compressor. Here too, the heat engine is automatically restarted if the comfort demand is no longer ensured (when it is very hot and there is a lot of sunshine) or when the battery is too discharged.

For hybrids of the "stop & start" type, wherein the heat engine is only stopped when the vehicle is stopped, over durations that are generally short, a complement of thermic inertia on the cooling loop, typically in the form of a latent heat thermal reserve can suffice.

Electric or hybrid vehicles that have a substantial amount of electric autonomy, which is currently not widely available, are equipped as follows:

For heating, an electric resistance on the air or on the water, or a boiler of the additional boiler type for "great cold" vehicles.

The first solution provides services that are clearly lower than those of a thermal vehicle while considerably reducing the pure electric autonomy. The second, that burns fuel and that releases CO2 and other atmospheric pollutants, acceptable on a hybrid despite its cost, is hardly homogenous with the purpose of an electric vehicle.

For air conditioning, a traditional cooling loop, with a small electric compressor.

Here too, the compromise is often services that are more modest than those of a thermal vehicle, at the price of a substantial reduction in autonomy concerning electric traction, especially in town.

The insufficiency of the solutions available for electric and hybrid vehicles with high electric autonomy lead to consider that the sustainable solution for the future that is suited to this type of vehicle may entail the use of a reversible heat pump.

In its principle, the heat pump—which comprises a cooling loop such as that used in air conditioning, but which can be reversed in the winter—makes it possible, in a single system, to provide for the needs in heating as well as those for air conditioning in the passenger compartment.

Borrowing most of the energy needs from the surroundings, the heat pump has a high degree of efficiency, expressed as the ratio between the energy returned to the passenger compartment and the on-board energy that is consumed. Also referred to as the coefficient of performance or COP, this ratio can currently fall between 2 and 3 for air conditioning, and a bit more for heating. This can provide heating and air conditioning services that are identical to those of a thermal vehicle by devoting a tolerable portion of the energy of the traction battery.

The principle of the vapour-compression heat pump is well known, and has numerous applications, especially in housing.

It is also known that the efficiency of this cycle drops sharply when the difference in temperature between the exhaust side (exchanger with the outside air) and the distribution side (exchanger with the air introduced into the passenger compartment) increases. In automobile air conditioning, this difference is typically about 70° C. (70-80° C. hot side, and 0° C.-10° C. cold side). In heating, the figure reaches 110° C. and goes down under −30° C. cold side.

The use of a heat pump for heating consequently implies considerable oversizing of the compressor, with the normal coolants not very well adapted to such a temperature range. In housing, the use of large exchange surfaces makes it possible to very substantially reduce this amplitude, which is naturally impossible in the confined context of an automobile.

Manufacturers and motor vehicle equipment manufacturers are counting on the future supercritical $CO_2$ cycles, whereon the latter are concentrating the development and investment efforts, in order to resolve this difficulty. Such heat pumps will not become available for several years.

Other types of heat pumps continue to be the subject of research and publications. The constantly-increasing levels of performance with some of them may have them considered as possible alternatives to gas-compression heat pumps: magnetocaloric material heat pump, Stirling cycle heat pump, in particular.

SUMMARY OF THE INVENTION

Although the purpose of this invention is to propose a global thermal architecture that incorporates all of the needs, thermal resources and other constraints of an electric or hybrid automobile with electric autonomy, optimised in such a way as to satisfy the limited performances of the currently-available heat pump technologies, this invention applies to all types of heat pumps.

It aims to provide the heating and air conditioning services for the passenger compartment that are comparable to those of a modern thermal vehicle, amputating only marginally the autonomy of the vehicle, which is not a hindrance for the user, and not subjecting the latter to any specific constraints in use.

Although addressed in particular to electric and hybrid vehicles with electric autonomy declined using standard heat engine vehicles, the lifting of this latter constraint, for example within the framework of a new vehicle devoted to this form of traction, such as the future availability of better performing heat pumps with new or different technologies, can only improve the potential of the proposed architecture. The underlying innovative and inventive principles, other than certain specific claims that shall be discovered in the description, are independent of the type of heat pump, such as details on the design and sizing of the other units in relation to the proposed thermal architecture.

Likewise, the invention is not limited to light motor vehicles with electric autonomy. It is pertinent for all types of autonomous-cab vehicles that obey the constraints of the automobile type, of which the thermal conditioning of the passenger compartment is ensured at least partially by a heat pump that must borrow at least one portion of its thermal resource from the outside air, for heating as well as air conditioning.

Within the framework of the use of a heat pump, the general problems with supplying heating and air conditioning for vehicles with electric autonomy, mentioned above, can be broken down into the following more specific essential problems.

The available heat pump technologies can hardly satisfy the objectives of power density and energy efficiency of the thermal conditioning of the passenger compartment of vehicles with electric autonomy by bringing closer as much as possible the amplitude of the temperatures between the exhaust interface and the distribution interface of said heat pump, the amplitude of the temperatures between the air introduced into the passenger compartment and the outside air.

The difficulty lies in achieving this in the highly restrictive volume limits for the exchangers of the heating/air conditioning group, or HVAC, and the front side of the vehicle.

Although the high potential energy efficiency of the heat pump, for air conditioning and even more for heating, is attractive, one is often disappointed with the actual performance in practice, when applied to the automobile. The internal heat losses of the system, the variability of the operating conditions and the numerous transients wherein the pump is far from its optimal output explain the difference.

It is however critical to come close to the performance potential of the heat pump in order to meet the challenge of the thermal conditioning of the passenger compartment of vehicles with electric autonomy.

The potential thermal resources for the heat pump, and with the competition for the access to the exchange capacities with the outside air, the various units of the drive train have thermal regulation needs that vary according to the units and the conditions of use, in power and especially concerning temperature levels. Other than the thermal conditioning of the passenger compartment, this invention takes into account, and for some of them, takes care of, the thermal conditioning needs of the units of the drive train.

The case with the hybrid vehicle with electric autonomy is particularly critical for the access to the thermal exchange capacities with the outside air. The heat engine, of which the exhaust is abundant but at a high temperature, requires a dedicated exchanger. The heat pump and the rest of the drive train have more modest exhaust, which nevertheless can occasionally be substantial when cumulated, and especially at temperatures that are often close to that of the outside air, and consequently requiring large exchange surfaces.

In order to comply with the requirements of space and cost, and in order to avoid the swelling of thermo-hydraulic components in the parallel networks, all of the needs must be incorporated into a single heat management system, in terms of its physical architecture physique as well as in its operating losses.

Even if the latest-generation coolants are not as harmful to the environment, as long as these fluids remain sensitive substances, it is necessary to provide safe retention for them during the life of the vehicle, and recovery of them at the end of the life cycle.

Heat pumps that make use of an inert gas, or that do not contain a working fluid, will be exempt from this problem.

In heating, in order to borrow heat from the outside air, the exchanger has to be at a temperature that is less than that of the air.

When the latter is between 0 and 10° C., the coolant that flows through the exchanger is typically at a negative temperature. Upon contact with cold surfaces, the water vapour contained in the air in still relatively high quantities at these temperatures, tends to condense and to freeze, until it creates an accumulation of frost that rapidly obstructs the exchanger.

The phenomenon of frost formation, which is highly problematic for automobile applications wherein there is a quota on exchange surfaces, is a major hindrance in using the heat pump in the automobile.

The thermal conditioning of the passenger compartment in reality has three components: heating, air conditioning and controlling the hygrometry, in particular to avoid the formation of vapour on the windscreen.

On a conventional vehicle, the drying out of the air introduced into the passenger compartment is accomplished via condensation of the excess water vapour on a first exchanger associated to the air conditioning, the air then being reheated of a second heating exchanger, according to need.

Despite the highly different resources and constraints, the proposed architecture must preserve this essential service.

In order to benefit from the price and quality of units produced in very large series, the solution must be able to adapt to the heating and air conditioning units on the market, as well as to the conventional systems of exchangers on the front of automobiles.

Furthermore, entailing electric and hybrid vehicles with electric autonomy declined from standard heat engine vehicles, the solution must comply with the constraint of remaining entirely compatible with the original heating and air conditioning unit, its control logic for automatic thermal conditioning versions, the layout of the passenger compartment, the installation of the "thermal kit" (engine ventilator unit plus exchangers on the outside air) and the volumes allocated to the exchangers on the front side of the vehicle.

For the first time, a thermal architecture is proposed that is able to make use of the performance that is currently available with available heat pump technologies, which achieves all of the set objectives and provides a complete solution to the aforementioned problems.

The least of its merits is not to achieve this with a sobriety of means that clashes with the many proposals published in the last few years, of which it is hardly surprising that not one of them has been concretized in a practical realisation. This economy of means results from intensive communalization of the units and of the circuits between the different needs, associated with a requirement of harmonization between the physical networks and the logical conduct of the system.

To that effect, the invention proposes a motor vehicle comprising a low exhaust heat engine for driving the driven wheels and a system for conditioning the air temperature of the passenger compartment, said conditioning system including a reversible heat pump which conditions in temperature respectively a distribution loop and an exhaust loop through which flows a coolant, the distribution loop being connected to an exchanger with the air entering the space compartment and being connectible via an electromagnetic valve to another exchanger with the air entering the passenger compartment, the exhaust loop being connected to an exchanger with the outside air, said exhaust loop being further connected to the engine for exchanging heat with said engine.

BRIEF DESCRIPTION OF THE DRAWINGS

Other particularities and advantages of the invention shall appear in the description that follows, made in reference to attached FIGS. 1 to 6 which respectively show an embodiment of a system for conditioning the air temperature of the passenger compartment of a vehicle according to the invention.

DETAILED DESCRIPTION OF THE PREFERRED EMBODIMENTS

Figure 1:
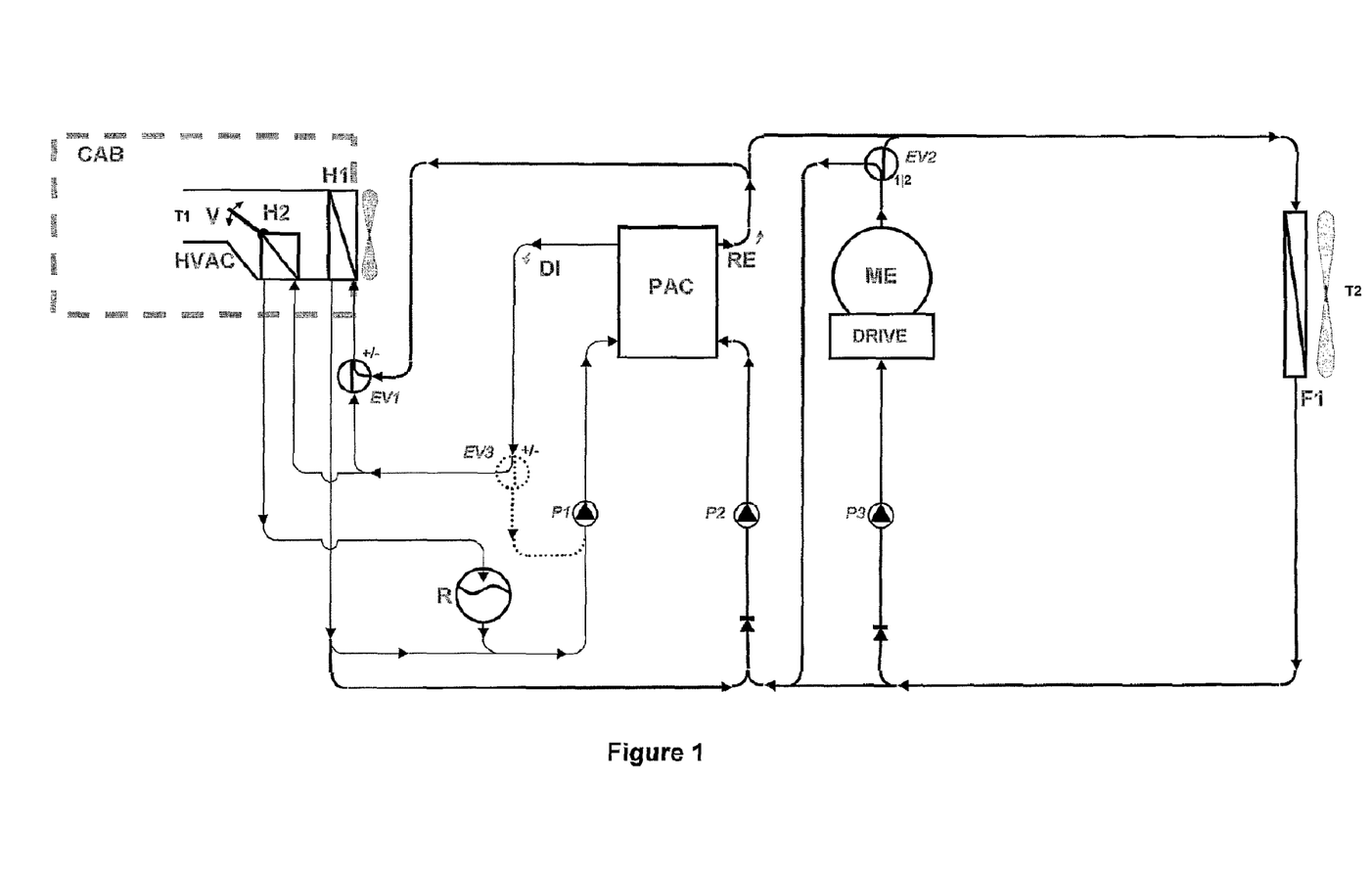

The embodiment shown in FIG. 1 is described below.

The conditioning system comprises a reversible compact heat pump PAC, of which the internal technology—vapour compression cycle, magnetocaloric effect machine, Stirling machine, Peltier effect system, etc.—and the inversion device—intrinsic to the technology, or via an auxiliary circuit that is conventionally internal to the scope of said heat pump—are indifferent relating to the invention. The pump PAC is connected to two circuits wherein a coolant flows, typically glycol water.

The distribution circuit DI is connected to the HVAC heating/air conditioning unit of the passenger compartment CAB. This group is of conventional construction, and details on its operation are provided further on. More precisely, it is permanently connected to the "air heater", that here we will refer to as exchanger H2 and it can be connected, according to the position of the electromagnetic valve EV1, to the exchanger H1 (or "evaporator" to use the conventional name of this exchanger which is normally a part of the air conditioning loop of a conventional vehicle, supplied by a coolant, but which, according to a preferred embodiment, is here diverted from its original function, or where applicable is substituted for it, and wherein the coolant flows).

The exhaust circuit RE, is connected on the one hand to the electric engine ME and to its electronic drive housing or "DRIVE", in series or in diversion according to the position of the electromagnetic valve EV2, and to the exchanger F1 on the front side on the outside air. A branching of this circuit is furthermore connectable to the exchanger H1 by the intermediary of the electromagnetic valve EV1.

The different branches are animated by suitable electric pumps (P1 to P3, in FIG. 1).

An expansion tank R, coolant reserve, pressurization and gas purging, is common to the two circuits DI, RE. Resupplied continuously from above by the distribution circuit DI, as shown, it further comprises a thermic inertia that stabilizes the distribution loop which naturally has little thermic inertia, contrary to the exhaust loop that incorporates the engine ME, and also contrary to the heating circuit of a conventional vehicle that contains the internal combustion engine. A tank of sufficient capacity and thermally-insulated will be favoured for this reason. According to a preferred embodiment, in order to increase the performance of this buffer storage, a hollow cellular structure—continuous or comprised of a stack of hollow elementary volumes, is incorporated of the inside of the tank around wherein the coolant can flow freely, and containing one or several phase change substances, of which the transition temperatures correspond to the optimal temperature ranges of the distribution loop for heating and for cooling. In addition to its role of stabilizing the operating point of the heat pump PAC, this thermal reserve makes it possible to immediately have air introduced into the passenger compartment at temperature during the restarting of the vehicle after a stoppage of a few dozen minutes, or to relay the pump PAC for a few minutes, during a possible defrosting operation of the exchanger F1, or when exceptional conditions (for example on a slope with a very high outside temperature), the pump PAC must temporarily withdraw for the benefit of cooling the electric engine ME.

In winter and in the spring and autumn, the heat pump PAC heats the distribution loop DI and cools the exhaust loop RE.

In cold weather—typically below 3° C.—the variable electromagnetic valve EV1 mixes the coolants coming respectively from the distribution loop DI (hot) and from the exhaust loop RE (cold) in such a way that the exchanger H1 preheats the air introduced into the passenger compartment.

According to the vehicle equipment trim level, the position of the mixing member V is either controlled by the passenger compartment conditioning calculator, or linked to the manual temperature control available to the driver. In both cases, the electromagnetic valve EV1 displaces the mixture towards the "hot" as the outside temperature T2 decreases, quickly in the first case, and more progressively in the second case so as to stabilize the response of the manual heating control.

According to the conventional operation of the HVAC unit, a portion of the flow of heated air on the exchanger H1, according to the position of the member V, is reheated on the exchanger H2 then remixed with the rest of the flow that bypassed the exchanger H2. At maximum heating power, we thus benefit from the capacity of two exchangers, which makes it possible to substantially lower the temperature of the coolant needed to heat the passenger compartment in very cold weather. Where a conventional vehicle requires 80° C., 50° C. is sufficient here.

With moderate temperatures, typically between 3 and 20° C. according to the amount of sunshine, the heat pump maintains the same direction of work, but the electromagnetic valve EV1 is positioned in such a way that the exchanger H1 is now supplied with cold liquid regulated by the electromagnetic valve EV1, still by mixing fluids coming from the distribution and exhaust loops, at a temperature that is substantially less than that of the outside air T2, but greater than 0° C. in order to avoid frost formation. The fresh air introduced into the passenger compartment can thus be discharged of a portion of its humidity by transferring latent heat to the exchanger H1 and then reheat itself on the exchanger H2 according to the need, before penetrating into the passenger compartment. This latent heat is recovered on the exhaust loop RE and is upgraded as a resource of the heat pump PAC. Having abundant temperate thermal resources on its exhaust loop, the heat pump has no difficulty in delivering 60° C. on its distribution loop, a temperature that is very sufficient to ensure proper heating in these conditions.

If however, the heating power becomes limited in providing a suitable temperature for the air introduced into the passenger compartment, especially towards the low temperatures and at high pulser speeds (fan of the HVAC unit), the calculator intervenes on the electromagnetic valve EV1 to heat the exchanger H1 according to the needs.

In very hot weather, typically above 20° C. according to the amount of sunshine and the temperature of the exhaust loop (which depends on the intensity of use of the traction engine), or more simply when the cooling power of the exchanger H1 becomes insufficient, the heat pump is reversed. The distribution loop DI is now cold, and the exhaust loop RE is hot. The electromagnetic valve EV1 regulates the air temperature T1 at the outlet of the HVAC unit according to the setting (generated by the passenger compartment conditioning calculator, or the manual temperature control, according to the case). FIG. 1 takes into account the hypothesis that the control logic of the member V by the passenger compartment conditioning calculator or the manual temperature control, is reversed simultaneously to the inversion of the heat pump PAC. The practical realization of this inversion of control does not induce any difficulty in principle, especially if the member benefits from a motorized actuator. In this case the regulation on the electromagnetic valve EV1 accompanies the member by supplementing its action in order to obtain the desired amplitude and the progressivity of the regulation of the temperature T1. In the case where the control of the member V cannot be reversed, a shut-off electromagnetic valve would be introduced on the supply of the exchanger H2—not shown, closed when the heat pump is in "cooling" configuration, in order to favour the flow in the exchanger H1. In this case, the position of the member would be indifferent, with regulation being accomplished solely by the electromagnetic valve EV1. A second preferred embodiment, alternative, shown in the embodiment shown in FIG. 6 and explained further on, preserves the regulating capacities of the temperature of the passenger compartment by the mixing member V in all conditions.

On the distribution loop DI side, the architecture and the mode of conduct proposed make use of all of the exchange potential of the two exchangers in all climatic conditions. As has been shown, the temperature regulation of the passenger compartment is accomplished mainly by the mixing member, as with the conventional unit. Its action is supplemented by the control of the electromagnetic valve EV1 that regulates the proportion of the fluid taken in the exhaust loop RE introduced into the exchanger H1.

Optionally, the device can be supplemented by a recirculation electromagnetic valve EV3. It is justified mainly in order to favour the rapid convergence, after start-up, of the temperature of the fluid that supplies the distribution loop DI at the outlet of the pump PAC, for heat pump technologies that would have difficulty in quickly reaching their full performance. We shall take advantage of its presence as a supplementary means of regulating the heating power, this time by decreasing the flow of water through the exchangers H1 and H2. The combination of the two means should make it possible in each case to find the most economical operating point.

On the exhaust loop RE side, when the heat pump PAC is in "heating" configuration, the electromagnetic valve EV2 is positioned so that the engine (and its drive) ME are supplied upstream and in series in relation to the pump PAC, in order to best enhance its heat exhaust. On the contrary, when the pump PAC is reversed, in times of "very hot weather" as described hereinabove, the electromagnetic valve EV2 is positioned so that the engine ME and the pump PAC, are supplied in parallel, in such a way that each one is supplied by liquid coming directly from the exchanger on the front side on the outside air F1, which is provided in order to obtain optimal efficiency at the increased flow corresponding to this configuration.

Let us analyze how this arrangement meets the objectives and solves the problems of the thermal conditioning of the passenger compartment of vehicles with electric autonomy implementing a heat pump, such as mentioned hereinabove.

It has been shown that the services of winter and of summer comfort were provided at the same level as a conventional vehicle, with the same volumes of exchangers.

For an average automobile, the compressor should not consume more than 2 kW in extreme conditions, and much less in more representative conditions, thanks is particular to the upgrading of the heat exhaust of the electric engine and the condensation of the excess water of the air introduced into the passenger compartment. For most uses, the impact on the autonomy will be hardly noticeable.

The temperature amplitude between the exhaust and distribution interfaces of the heat pump is greatly reduced, thanks on the one hand to the association of the two exchangers of the heating unit in extreme conditions, as has been shown, but also on the exhaust side, thanks to the upgrading of the heat exhaust of the electric engine, which minimizes the energy to be borrowed from the surroundings and thus allows for an exhaust temperature that is a little lower, for like-for-like exchanger.

The heat pump module, compact and installable in the close vicinity of the heating unit, facilitates the isolation of the sensitive zones and minimizes the distances to travel, thus making it possible to efficiently contain heat losses. The presence of the two secondary glycol buffer loops is beneficial in stabilizing the operating points, in relation to the normal case wherein condenser and evaporator are directly subjected to the ups and downs of the outside conditions. Furthermore, the thermal inertia of the electric engine on the exhaust loop, and of the reserve of glycol water on the distribution loop contributes effectively in stabilizing the two loops.

The coolant (case with a vapour-compression heat pump) is contained in the compact heat pump module, which is totally sealed off. All mechanical interventions, except those concerning the pump itself which are carried out in the workshop after the module is dismounted, are accomplished without purging the coolant.

The reduced temperature difference between the exhaust coolant and the outside air, thanks to the thermal gains of the electric engine ME, and of the exchanger H1 still connected to the exhaust loop in conditions that are favourable to frost formation, substantially minimizes the occurrences of frost formation of the exchanger F1. If however an obstruction starts to take place, the calculator detects it through a shift in the parameters of the heat pump. All it has to do is shut down the pump for a few minutes, without even reversing it, in order to quickly defrost the exchanger thanks to the heat exhaust of the engine ME and of the exchanger H1. Thanks to the inertia of the reserve of glycol water on the distribution loop, the interruption is transparent for the passengers. During the operation, the pumps P1 and P3 remain active, with the latter at its maximum speed.

Demisting is treated in a very effective manner, conventionally in the automobile, by condensing the water vapour on the exchanger H1 cooled by the exhaust loop, while the exchanger H2 ensures the heating of the air, noting that the conditions wherein there is a need to dehumidify the air entering into the passenger compartment, correspond to moderate heating needs, for which it is not necessary to mobilize the two exchangers of the heating unit.

Other than the heat pump and its supply, the proposed system makes use of standard automobile components in optimized numbers, as reduced as possible. It is compatible with any original heating and air conditioning unit, without any modification other than the access to the temperature setting (at least, the position of the mixing member V) and the installation of a blown air temperature sensor if there is not one. It leaves the layout of the passenger compartment unchanged, does not call into question the exchangers of the HVAC unit and retains the installation and volumes of the exchangers on the front side.

The control logic of the system cohabitates with the possible passenger compartment conditioning calculator, without modification or reconfiguration of the latter, except for the neutralization—or the simulation according to the case, of incoming information coming from suppressed units such as the air conditioning compressor. The temperature control of the first exchanger on the air entering into the passenger compartment by the electromagnetic mixing valve with the exhaust loop, supplements the action of the mixing member by reacting to the variations in the setting—manual or provided by the passenger compartment conditioning calculator of the HVAC unit, for example read through the displacements of the member, thus potentially without interfering with said possible passenger compartment conditioning calculator which remains master, in such a way as to preserve the continuity of the amplitude and the progressivity of the temperature regulation of the air introduced into the passenger compartment regardless of the orientation of the reversible heat pump on the one hand, and on the other hand to regulate the hygrometry of the same air introduced into the passenger compartment according to the temperature of the outside air.

This conduct logic is easily installable in the on-board calculator or a dedicated calculator. It is easy to programme, is deterministic, and is largely predefined: a minimum number of parameters is to be set according to the application, and most can be calculated. As such, the solution can be installed without jeopardizing the optimization and the fine tuning of the HVAC unit in relation to the specificities of the model for which it was developed.

Figure 2:
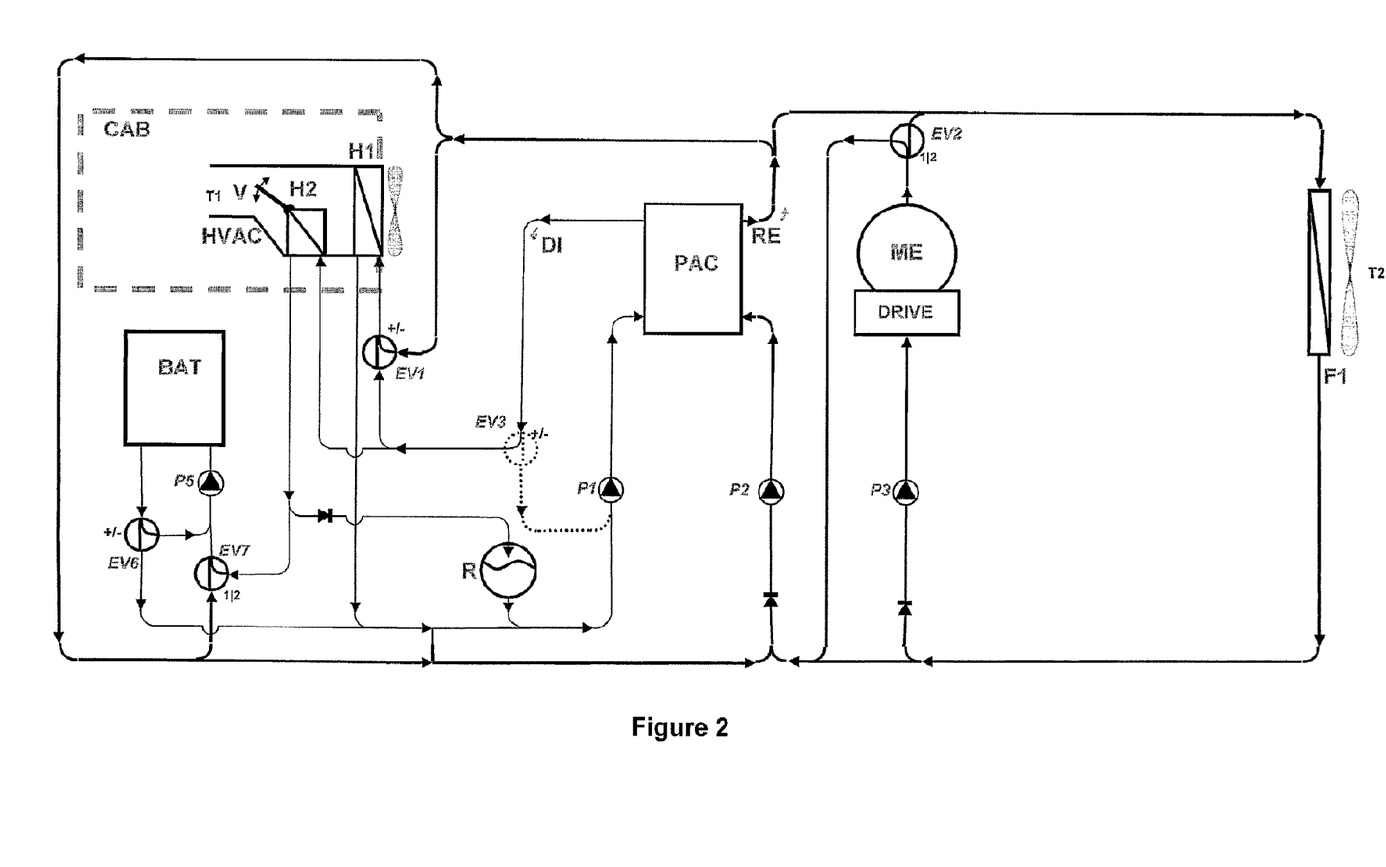

The embodiment in FIG. 2 which adds to the preceding embodiment the thermal conditioning of the traction battery BAT is described below.

Traction batteries typically have an internal temperature range corresponding to an optimal compromise between performance (returned power and energy) and longevity.

For example, with certain lithium-based chemistries, it may be desired to operate the battery more preferably between 20° C. and 40° C. Maintaining these conditions in the summer as well as in the winter will guarantee a high degree of stability of the performance and of the autonomy of the vehicle. As the variations of the outside temperature largely exceed the operating temperature amplitude, the battery will be more preferably thermally-insulated from the surroundings.

This invention provides for the battery thermal conditioning needs of which the operating temperature range is covered by the temperature amplitude of the heat pump.

The battery degrades a percentage of its energy as heat, which is generally low (a few hundred Watts), but which is highly variable and potentially much more intense over short periods of time according to the conditions of use.

Having a high degree of thermic inertia with regards to modest internal thermal power, the battery can be mainly managed thermally via thermal preconditioning when it is being recharged on the mains, by using the resources of the internal heat management system of the vehicle, in such a way that the latter is only exceptionally solicited for the battery when operating.

Nevertheless, the homogeneity of the temperatures inside the battery is of first importance. Even without the need to exchange calories with the battery when operating, the heat management system must be able to maintain the internal thermal homogeneity of the battery.

Especially, the priority of a heat management system for the battery is to prevent it from reaching internal temperatures at which it would present risks of exothermic runaway. If for any reason, mainly a malfunction, an alert threshold is reached, the heat management system of the vehicle must be able to prioritize its resources in order to powerfully cool the battery.

In the embodiment shown, the battery BAT has an autonomous cooling loop animated by the pump P5, connected to the distribution loop DI and to the exhaust loop RE by the switching electromagnetic valve EV7, while the recirculation electromagnetic valve EV6 regulates the flow of renewing the fluid of the loop. An alternative embodiment, not shown, would make the electromagnetic valve EV6 a switching valve and the electromagnetic valve EV7 a progressive mixing valve.

The proposed arrangement makes it possible to maintain a permanent circulation of coolant in the battery in order to homogenize its internal temperatures. In case of a need to heat or cool, the electromagnetic valve EV6 allows a certain flow of fluid to return towards the circuits of the vehicle, leaving room for fresh fluid, entering by the electromagnetic valve EV7, hot or cold according to the need and taken from the distribution circuit DI of exhaust RE according to the configuration of the heat pump (heating or cooling) at the time. The process is managed by the calculator of the vehicle according to the temperatures of the loops.

Note that this arrangement makes it possible, during operation if necessary as well as when recharging, to condition the battery hot or cold, independent of the orientation of the heat pump PAC and of the conditioning or preconditioning needs of the passenger compartment or, as shall be seen further on, of the thermal storage.

Figure 3:
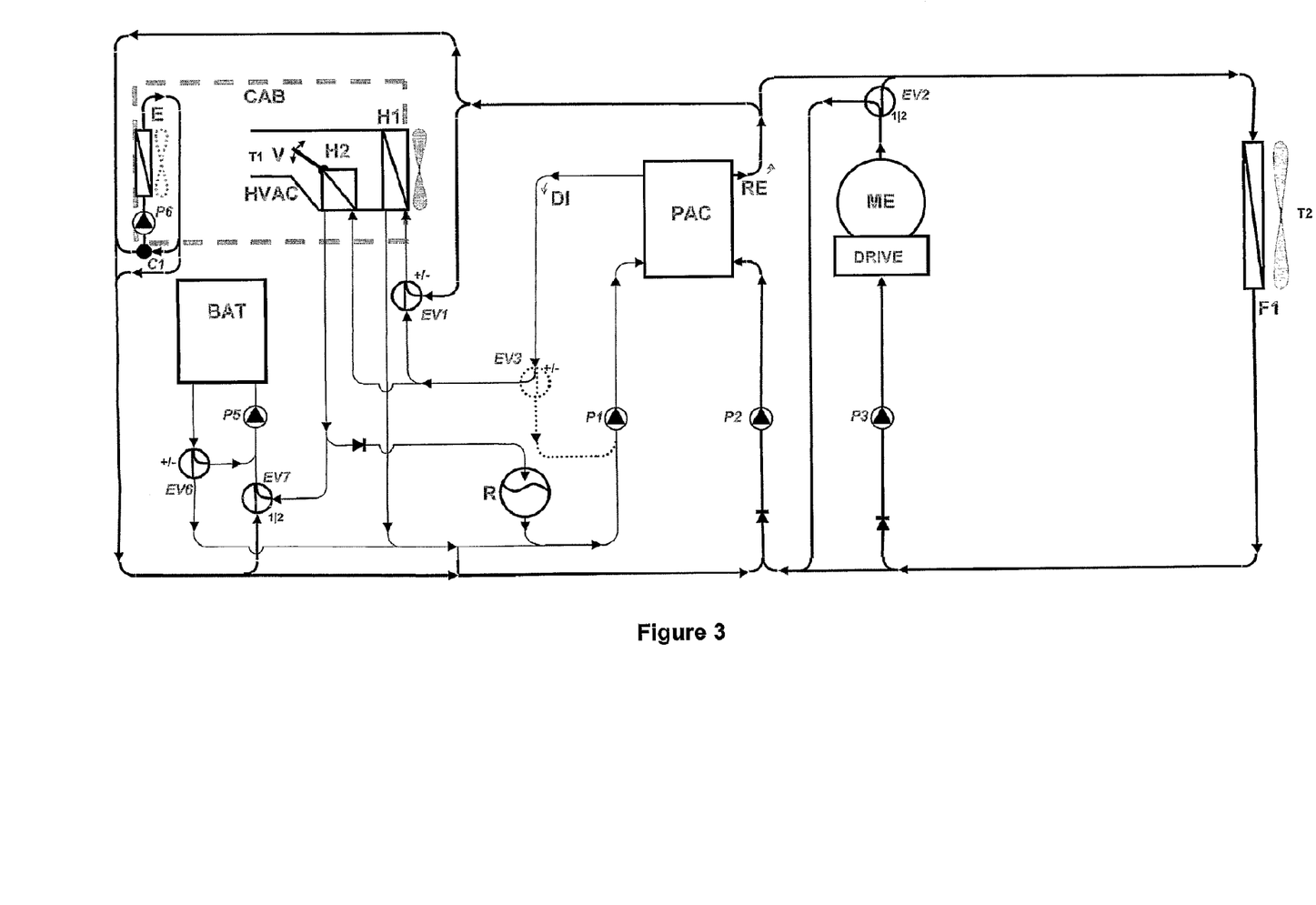

The embodiment in FIG. 3 which adds to the preceding embodiment the thermal recovery on the extracted air of the passenger compartment is described below.

In the automobile, the major portion of the energy provided for the thermal conditioning of the passenger compartment is directly discharged into the surroundings with the extracted air. From the standpoint of the heat pump, this energy is at a thermal level that is more favourable than that of the outside air, and the extracted air shows a potential resource of very good quality. Contrary to units such as the electric engine which are a resource for heating, but which are concurrent for cooling, a recovery exchanger on the extracted air is permanently an appreciable resource, in the summer as well as in the winter.

The power that could be recovered as such is estimated to be 1 KW. In extreme conditions, this additional resource on the exhaust loop is in practice diverted to the distribution loop, and dopes the performance of the heat pump in the conditions in which it tends to fall. In normal conditions, it is perhaps 200 W of electrical consumption on the average that can be avoided, over the year.

When assessed, and as an order of magnitude, the recovery of the energy of the extracted air will thus make it possible to reduce by 10% the sizing and the average consumption of the heat pump, while still gaining 5% on the performance of the system.

In the summer, the average temperature differential between the fluid and the extracted air can be 25° C. In the winter, as the fluid cannot be less than 0° C., otherwise frost would quickly form on the exchanger, the temperature differential falls around 15° C., but the recovery of the latent heat from the condensation of the water vapour, largely contributes here to the total recoverable power.

In the embodiment shown, the exchanger on the extracted air of the passenger compartment E is arranged at the rear of the vehicle, to the right of the air extractor. It is supplied from the exhaust loop, with fluid taken from the outlet of the pump PAC. It is incorporated into a secondary regulation loop animated by a circulator P6, controlled by a thermostatic valve C1, which keeps the loop at a temperature greater than or equal to 0° C., preventing any risk of frost formation. The recovery module also comprises a condensation water collection and evacuation device. Optionally, it can be provided with a mini pulser, which makes it possible to use an exchanger with a higher performance level. In practical realization, it is important to allow for a capacity to evacuate the excessive pressure from closing the doors, by an exchanger having a section of passage on the air that is sufficient or more preferably by a parallel evacuation device, with member, thus normally sealed outside of these circumstances.

The same diversion of the exhaust loop RE supplies the battery, also located at the rear of the vehicle, in such a way that the recovery on the extracted air introduces only very little length in terms of additional ducts.

Figure 4:
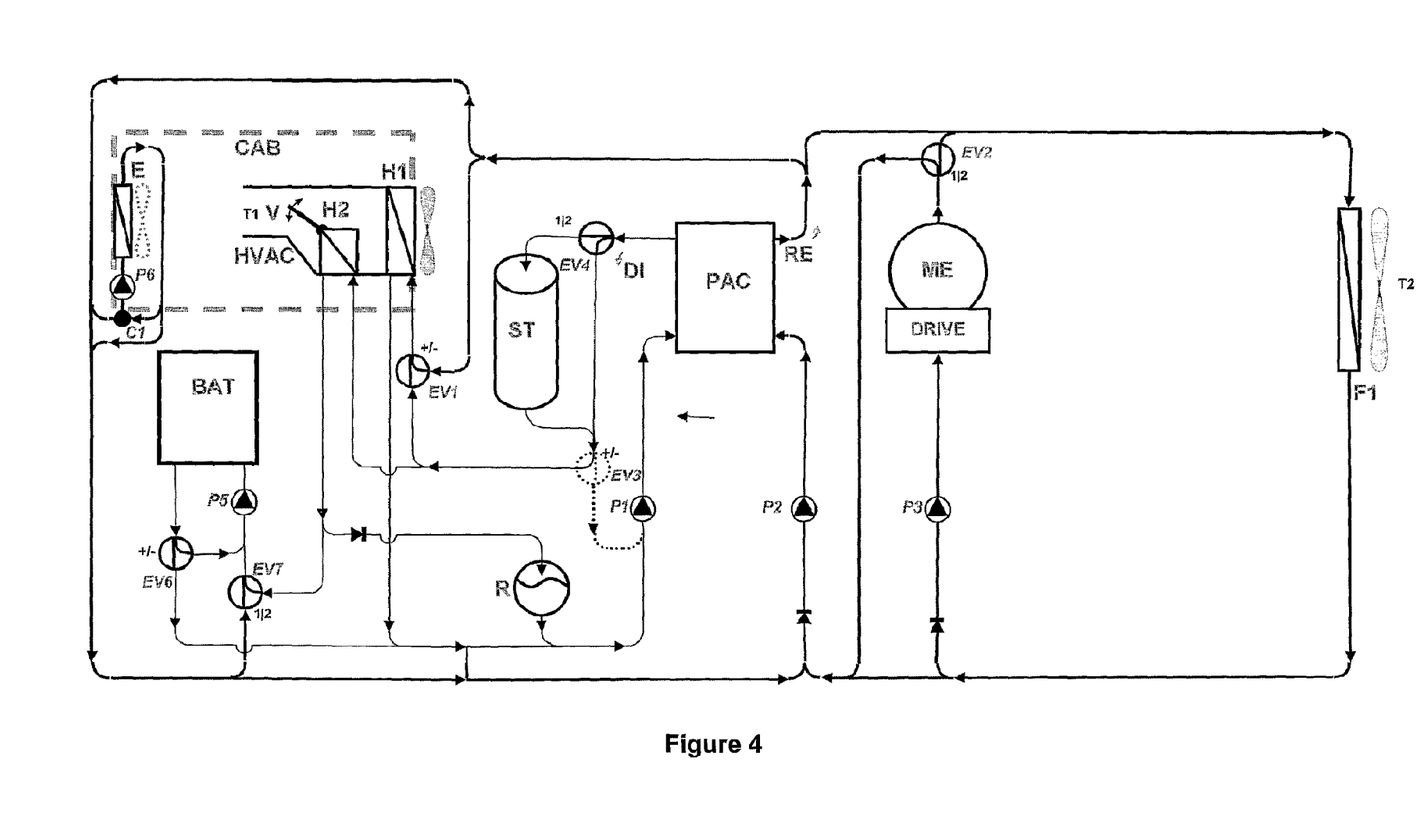

The embodiment in FIG. 4 which adds to the preceding embodiment the thermal storage is described below.

In addition to the thermic inertia tampon constituted by the tank R arranged for this purpose, a larger thermal reserve may be desired, that can be preconditioned during recharging at the outlet, cold or hot according to the season. The thermal storage ST can return the "free" energy, especially as extra power during critical phases such a restarting after an extended period of parking (in the cold or in the sun).

In particular, the distribution loop DI is connected to said reserve in such a way as to exchange heat with it, especially by incorporating the thermal energy inertial reserve ST with the distribution loop DI upstream of the exchangers H1, H2 with the air entering into the passenger compartment CAB.

The thermal energy inertial reserve ST can include a quantity of one or several phase change substances in a determined temperature range.

Furthermore, the distribution loop DI comprises an electromagnetic valve EV4 which makes it possible to isolate the inertial reserve ST from said distribution loop. In particular, the electromagnetic valve EV4 makes it possible to isolate it from the distribution circuit, in the case where it would be empty or unfavourably conditioned in relation to the needs at the time, in such a way as to not compromise the reactivity of the conditioning system.

Figure 5:
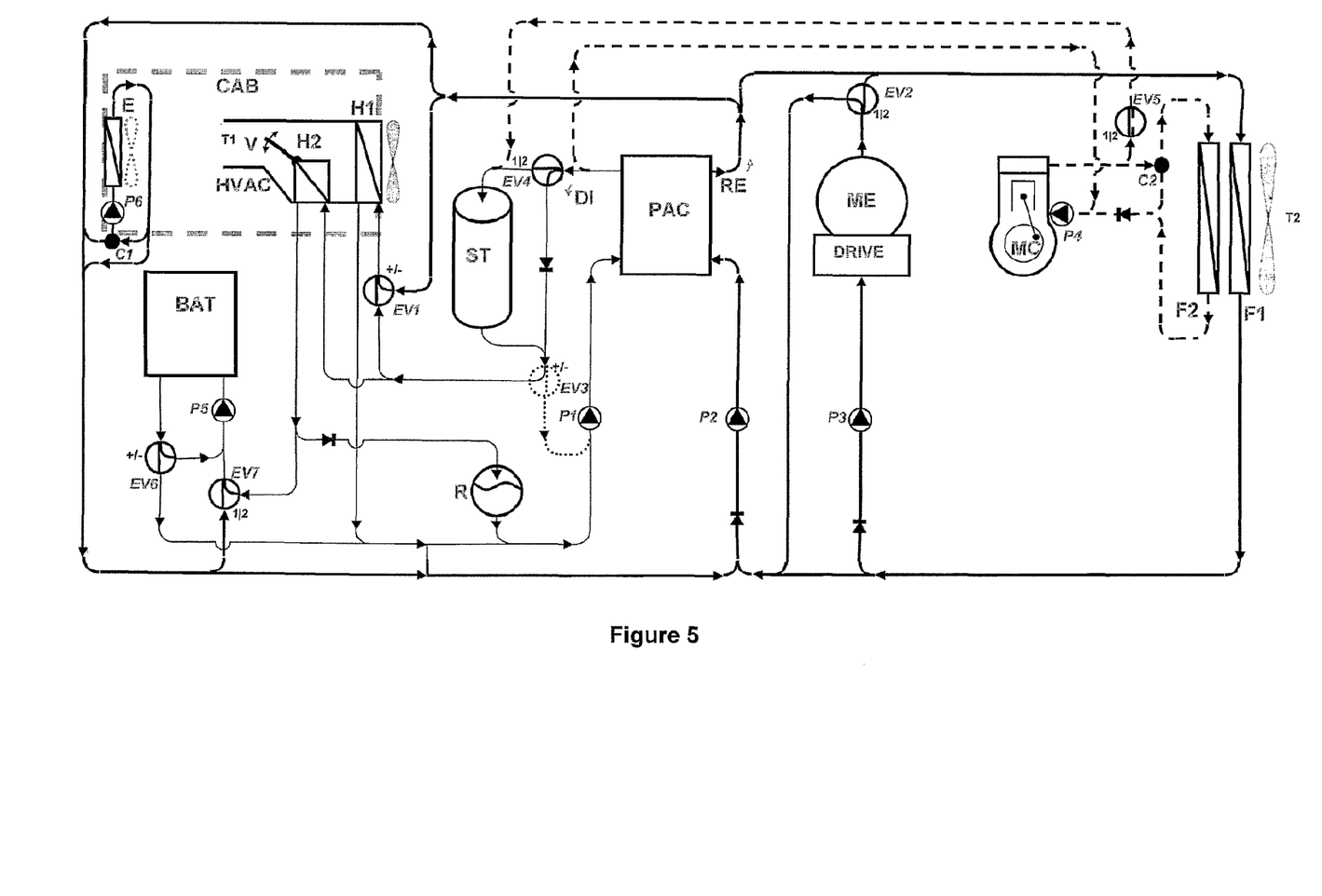

The embodiment in FIG. 5 which adds to the preceding embodiment an internal combustion heat engine MC is described below.

The internal combustion engine MC has its own cooling circuit, traditionally comprising an exchanger F2 an incorporated pump P4 and a regulator thermostat C2 that regulates the temperature of the glycol water by recirculating all or a portion of its flow in the engine by bypassing the exchanger F2.

The water outlets traditionally provided for the heating of the passenger compartment are here connected on the distribution loop DI under the control of the shut-off electromagnetic valve EV5.

When the combustion engine is operating and when heating is needed, it then takes the relay from the pump PAC which can be stopped. The thermal storage ST is then reconstituted when applicable.

Due to the permanent communication of the return branch of this link with the circuits of the heat pump, the cooling loop of the internal combustion engine shares the same tank R of coolant reserve, pressurization and gas purging, described hereinabove. This tank is actually unique in the vehicle and supplies the entire cooling network.

The embodiment in FIG. 6 which adds to the preceding embodiment the use of a relay heat pump for very low temperatures is described below. In this embodiment, the motor vehicle further comprises a second heat pump PAC2 of which the exhaust loop RE2 supplies the exchanger F1, the distribution loop of said second heat pump being connectable to the exhaust loop RE by the intermediary of an electromagnetic valve EV8. As such, when this connection is established, the two heat pumps determine between thereof an intermediate loop isolated from the exchanger F1 and supplying the engine ME, and possibly the other following units: DRIVE engine electronic control unit, exchangers on the air introduced into the passenger compartment H1, H2, battery BAT, exchanger on the extracted air of the passenger compartment E. And, when this connection is not established, the exchanger F1 substitutes itself, with regards to the heat pump PAC, for said heat pump PAC2 in the exhaust loop RE.

Despite the favourable impact of all of the preceding devices in order to reduce the temperature amplitude of the pump PAC, there remains in extremely cold weather—below −18° C.—current heat pump technologies have difficulty in extracting calories from the icy-cold air, a considerable portion of the heat exhaust from the units, dissipated directly by the walls, being in addition lost, in such a way that the power output by the pump PAC falls inexorably although the needs are increasing. In these conditions, the difference widens further with conventional vehicles which continue to handle the situation honourably.

At our latitudes, a workaround recommendation for these exceptional situations may be the addition of an electric resistance on the air introduced into the passenger compartment, a standard device on most heating units in order to accelerate reaching the temperature in the passenger compartment while the engine is heating up, which could advantageously be reused here as an extra resource.

But it is proposed here to treat the problem in depth, either for vehicles intended for more Nordic countries, or as shall be seen, since this solution has the potential to go still further in optimizing the entire device.

First note that a heat pump returning 6 KW and optimized to operate between 0 and 60° C. would have an energy efficiency (COP) that is very high and would not take up much space in relation to a heat pump attempting to cover the range [−30° C., +60° C.]. The [0° C., 60° C.] choice symmetrizes the temperature needs of the two sources between the summer and the winter, in such a way that the reversible heat pump would run at the same optimal operating point in the summer as well as in the winter.

In the summer as in the winter, we would have a resource around 0° C. that can be used directly to dry the air entering into the passenger compartment on the exchanger H1 or recover calories from the extracted air of the passenger compartment on the exchanger E.

Note on the other hand that a relay heat pump of 3 KW operating between [−40° C., 0° C.], could use a dedicated coolant, benefit from an advantageous COP over this reduced range and, which in addition is not reversible, be particularly compact. Furthermore, it would be operated only for a reduced period of the year.

Figure 6:
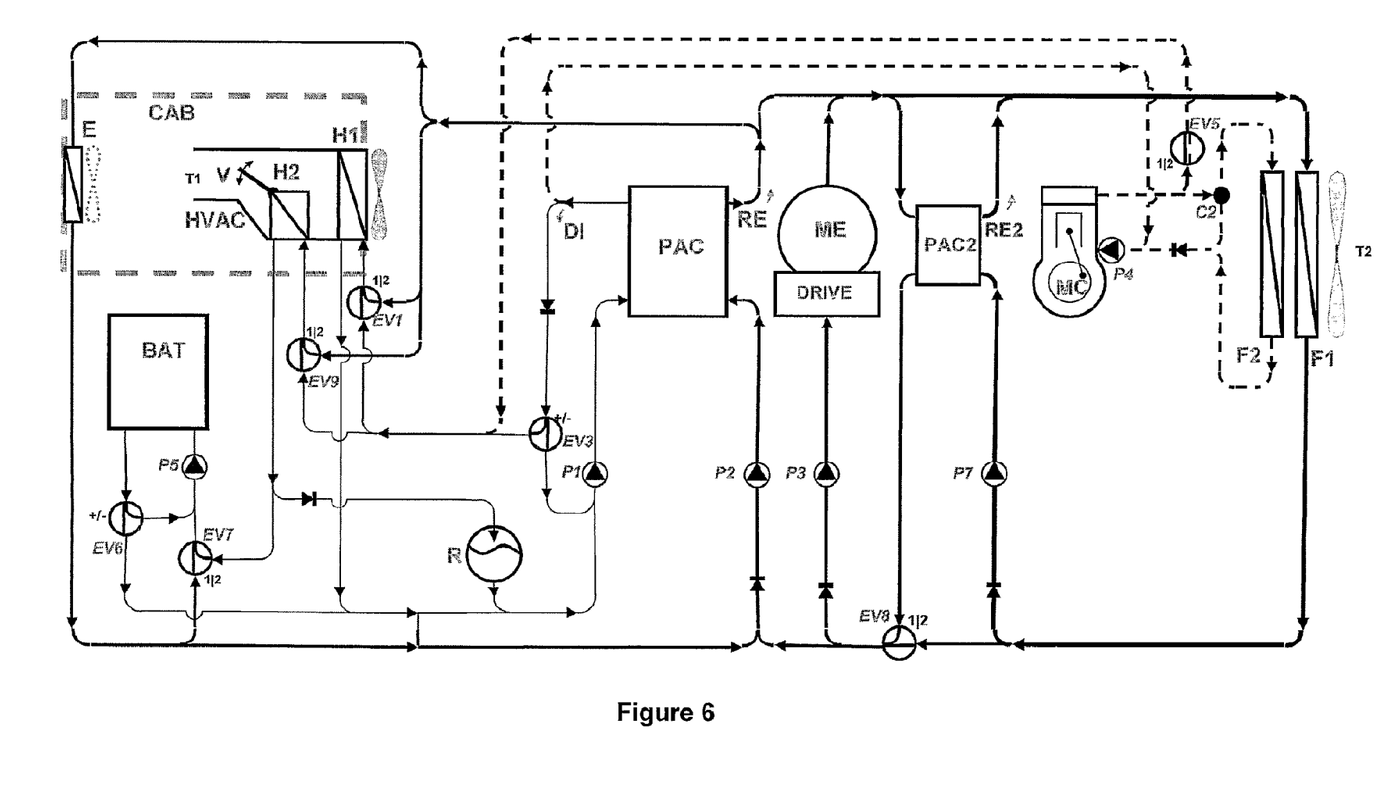

FIG. 6 shows how the preceding thermal architecture changes by dividing the heat pump PAC, with a wide operating domain and flexibility, into two specialized heat pumps in cascade.

On the exhaust loop RE, in cooling en configuration, the circulation is exactly the same as previously: the loop supplies in parallel the electric engine ME then the exchanger F1, the secondary heat pump PAC2 being disconnected from the circuit by the electromagnetic valve EV8 and the stopping of the pump P7.

In heating condition, however, the exhaust loop RE reloops on the distribution interface of the heat pump PAC2, by the electromagnetic valve EV8 while the engine ME remains in parallel between the two heat pumps. This intermediate loop is stabilized around 0° C. On the exhaust side of the pump PAC2, the loop RE2 is now animated by the pump P7 and supplies the exchanger F1.

It can be seen that it was possible to do without the parallel/series switching of the electric engine ME, and the exchanger temperature regulation loop on the extracted air E.

On the distribution loop DI side, the solution is shown here without thermal storage, undoubtedly less useful due to the fact that one must have enough power in the winter, thanks to the secondary heat pump, and in the summer, by the specialization of the main heat pump. One can expect performance that is genuinely equivalent, even superior in very cold weather, to that of a good thermal vehicle.

The second alternative of controlling the temperatures of the two exchangers on the air of the passenger compartment H1 and H2, mentioned in the description of the embodiment according to FIG. 1, is also shown. Two electromagnetic valves EV1 and EV9, of switching between the fluid coming from the exhaust loop RE or the fluid coming from the distribution loop DI, supplying H1 and H2 respectively. Furthermore the option of a recirculation proportional electromagnetic valve EV3 on the distribution loop, described hereinabove, is retained. In temperate conditions, EV1 and EV9 are positioned in such a way that H1 is supplied with cold fluid—always higher than 0° C. due to the specialization of the heat pump PAC, so without the risk of frost formation of H1, and H2 with hot fluid. This is the standard configuration of the HVAC heating unit in a conventional vehicle, perfectly managed by the original device for adjusting or controlling the temperature of the passenger compartment associated with said heating unit, via mixing member V. As has already been emphasized, this arrangement makes it possible to condense a portion of the water vapour contained in the air introduced into the passenger compartment and as such to effectively control the hygrometry of the passenger compartment by preventing vapours on glass surfaces.

Consider that in a somewhat cold temperature, the heat pump is configured for heating. EV1 supplies H1 with cold fluid taken from the exhaust loop RE, and EV9 supplies H2 with hot fluid taken from the distribution loop DI. With the outside temperature or amount of sunshine increasing, the heat pump PAC no longer has enough resources to ensure the comfort. This situation is analyzed by the on-board calculator which controls the inversion of the PAC into cooling configuration, and simultaneously the inversion of the electromagnetic valves EV1 and EV9. The control logic incorporates a hysteresis, in order to avoid unnecessary alternating inversions of the heat pump.

With extreme outside temperatures, either very cold, or very hot, the preceding configuration does not have the exchange power needed to satisfy the needs of the passenger compartment. The on-board calculator then positions EV1 and EV9 in the same direction, in such a way that H1 and H2, supplied by the distribution loop DI, work together for heating or respectively for air conditioning. In order to avoid this transition being accompanied by a burst of heat, or respectively of cold, in the passenger compartment, the valve EV3 reduces the flow in H1 and H2 in proportion to the demand in the case of a system with automatic conditioning, for example read through the position of the member V, or according to a determined strategy, for example associated with the measurement of the temperature T1 of the air diffused into the passenger compartment, in the case of a manual control unit.

The invention claimed is:

1. Motor vehicle comprising a low exhaust heat engine for driving driven wheels and a system for conditioning air temperature of a passenger compartment, said conditioning system including a reversible heat pump which conditions in temperature respectively a distribution loop through which a coolant flows and an exhaust loop through which a coolant flows, said distribution loop being connected to a first exchanger with air entering into the passenger compartment and said distribution loop being selectively connected by a first electromagnetic valve to a second exchanger with air entering into the passenger compartment, the exhaust loop being connected to a third exchanger with outside air, and said exhaust loop being further connected to the engine so as to exchange heat with said engine.

2. Motor vehicle as set forth in claim 1, wherein the low exhaust heat engine is an electric engine.

3. Motor vehicle as set forth in claim 2, wherein the exhaust loop exchanges heat with an electronic housing of the electric engine.

4. Motor vehicle as set forth in claim 1, wherein the exhaust loop comprises an electromagnetic valve wherein the electromagnetic valve selectively connects the engine and the third heat exchanger either in series or in diversion.

5. Motor vehicle as set forth in claim 1, wherein the exhaust loop is further connectable to the second exchanger by the electromagnetic valve.

6. Motor vehicle as set forth in claim 1, wherein a reserve of coolant is common to the distribution and exhaust loops.

7. Motor vehicle as set forth in claim 1, wherein a mixing member is provided between the flow of air entering into the passenger compartment from the first exchanger and the flow of air entering into the passenger compartment from the second exchanger.

8. Motor vehicle as set forth in claim 1, wherein a recirculation electromagnetic valve is provided in the distribution loop so as to regulate the flow of fluid in the first and second exchangers.

9. Motor vehicle as set forth in claim 1, wherein the exhaust loop is selectively connected to the second exchanger by the first.

10. Motor vehicle as set forth in claim 2, further comprising said electric engine having a power battery and said battery comprising a coolant loop which is connected to the distribution loop and to the exhaust loop.

11. Motor vehicle as set forth in claim 10, wherein the power battery has a thermal regulation loop with a pump and at least one valve providing regulation of the temperature of said thermal regulation loop of the battery or isolation of said thermal regulation loop from the rest of a hydraulic network for thermal management of the vehicle.

12. Motor vehicle as set forth in claim 1, further comprising a fourth exchanger for an extracted air of the passenger compartment which fourth exchanger is connected to the exhaust loop at an outlet of the heat pump.

13. Motor vehicle as set forth in claim 12, wherein the fourth exchanger is incorporated into a secondary regulation loop activated by a pump and controlled by a thermostatic valve.

14. Motor vehicle as set forth in claim 1, further comprising a thermal energy inertial reserve, and the distribution loop being connected to said reserve so as to exchange heat with said reserve.

15. Motor vehicle as set forth in claim 14, wherein the thermal energy inertial reserve is incorporated into the distribution loop upstream of the first and second exchangers with the air entering into the passenger compartment.

16. Motor vehicle as set forth in claim 14, wherein the distribution loop has an electromagnetic valve means for making it possible to isolate the inertial reserve from said distribution loop.

17. Motor vehicle as set forth in claim 14, wherein the thermal energy inertial reserve comprises a quantity of phase change substances in a determined temperature range.

18. Motor vehicle as set forth in claim 1, further including a heat engine and a cooling loop of said heat engine connected with a fourth exchanger with the outside air, and said loop being connected to the distribution loop.

19. Motor vehicle as set forth in claim 18, wherein a reserve of coolant is common to the distribution and exhaust loops and to the cooling loop of the heat engine.

20. Motor vehicle as set forth in claim 1, further comprising a second heat pump having an exhaust loop which supplies the third exchanger and a distribution loop of said second heat pump being selectively connected to the exhaust loop by another electromagnetic valve.

* * * * *